(12) United States Patent
Dattawadkar

(10) Patent No.: US 10,677,295 B2
(45) Date of Patent: *Jun. 9, 2020

(54) ROCKER ONE-WAY CLUTCH WITH CUTOUT TO LOCATE A SPRING AND STATOR INCORPORATING THE SAME

(71) Applicant: SCHAEFFLER TECHNOLOGIES AG & CO. KG, Herzogenaurach (DE)

(72) Inventor: Aditya Dattawadkar, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,125

(22) Filed: Mar. 27, 2018

(65) Prior Publication Data

US 2018/0209492 A1 Jul. 26, 2018

Related U.S. Application Data

(63) Continuation of application No. 14/867,427, filed on Sep. 28, 2015, now Pat. No. 10,094,433.

(60) Provisional application No. 62/057,491, filed on Sep. 30, 2014.

(51) Int. Cl.
  *F16D 41/12* (2006.01)
  *F16H 41/24* (2006.01)
  *F16D 41/30* (2006.01)

(52) U.S. Cl.
  CPC .............. *F16D 41/12* (2013.01); *F16H 41/24* (2013.01); *F16D 41/30* (2013.01)

(58) Field of Classification Search
  None
  See application file for complete search history.

(56) References Cited

U.S. PATENT DOCUMENTS

| | | | |
|---|---|---|---|
| 628,249 A | 7/1889 | Kane | |
| 414,545 A | 11/1889 | Jones | |
| 1,883,966 A | 10/1932 | Krause | |
| 2,655,052 A | 10/1953 | Montalto | |
| 10,094,433 B2 * | 10/2018 | Dattawadkar | F16D 41/12 |
| 2001/0035322 A1 | 11/2001 | Reinhart et al. | |
| 2003/0146063 A1 | 8/2003 | Yamada et al. | |
| 2007/0131509 A1 | 6/2007 | Kimes | |
| 2010/0288592 A1 | 11/2010 | Papania et al. | |

(Continued)

*Primary Examiner* — Charles A Fox
*Assistant Examiner* — Ryan P Dodd
(74) *Attorney, Agent, or Firm* — Brooks Kushman P.C.

(57) ABSTRACT

A rocker one-way clutch including an outer race including a pocket and a strut including a main body rotatable within the pocket and a locking member including a first neck portion extending from the main body and a cutout operatively arranged within the first neck portion to prevent displacement of a spring member. A rocker one-way clutch including an inner race, an outer race arranged radially outward of the inner race concentrically, the outer race including a pocket, a strut including a main body rotatable within the pocket and a locking member, the locking member including a first neck portion extending from the main body, a cutout operatively arranged within the first neck portion to prevent displacement of a spring member and a protrusion operatively arranged within the first neck portion opposite of the cutout to ensure proper assembly of the strut within the inner and outer races.

17 Claims, 7 Drawing Sheets

(56) References Cited

U.S. PATENT DOCUMENTS

| | | |
|---|---|---|
| 2013/0213027 A1 | 8/2013 | Bird et al. |
| 2014/0062174 A1 | 3/2014 | Chen |
| 2014/0197002 A1* | 7/2014 | Lindemann ............. F16D 41/12 192/45.1 |
| 2014/0326566 A1* | 11/2014 | Lindemann ............. F16D 41/12 192/45.1 |

* cited by examiner

Fig. 1

PRIOR ART

Fig. 2

PRIOR ART

Fig. 3

PRIOR ART

Fig. 4a

PRIOR ART

ROCKER ONE-WAY CLUTCH WITH CUTOUT TO LOCATE A SPRING AND STATOR INCORPORATING THE SAME

CROSS-REFERENCE TO RELATED APPLICATIONS

This application is a continuation of U.S. application Ser. No. 14/867,427 filed Sep. 28, 2015, now U.S. Pat. No. 10,094,433 issued on Oct. 9, 2018, which, in turn, claims the benefit of U.S. provisional application Ser. No. 62/057,491 filed Sep. 30, 2014, the disclosures of which are hereby incorporated in their entirety by reference herein.

TECHNICAL FIELD

The invention relates generally to a rocker one-way clutch, and, in particular, a stator having a rocker one-way clutch having a cutout on a strut to maintain the position of a spring and a mechanism for ensuring the strut is properly assembled within the stator.

BACKGROUND

U.S. Patent Application Publication No. 2013/0213027 (Bird et al.) discloses a one-way brake for a torque converter stator. The stator disclosed is formed with blades spaced mutually angularly about an axis. The stator disclosed further includes a hub located radially inward of the blades. The stator includes an outer race which includes pockets spaced angularly about the axis. Each pocket includes a rocker, sometimes called a strut, and a spring, which continually urges a respective rocker to pivot in its pocket toward engagement with cams formed on an outer surface of the inner race, arranged radially inward of the hub. The one-way rocker brake prevents counterclockwise rotation of the stator relative to the stator shaft and race.

U.S. Patent Application Publication No. 2014/0197002 (Lindemann et al.) discloses a symmetrical strut for a rocker one-way clutch that provides the same functionality whether installed with a top or a bottom side into a pocket for a race for the clutch.

Figure 2:
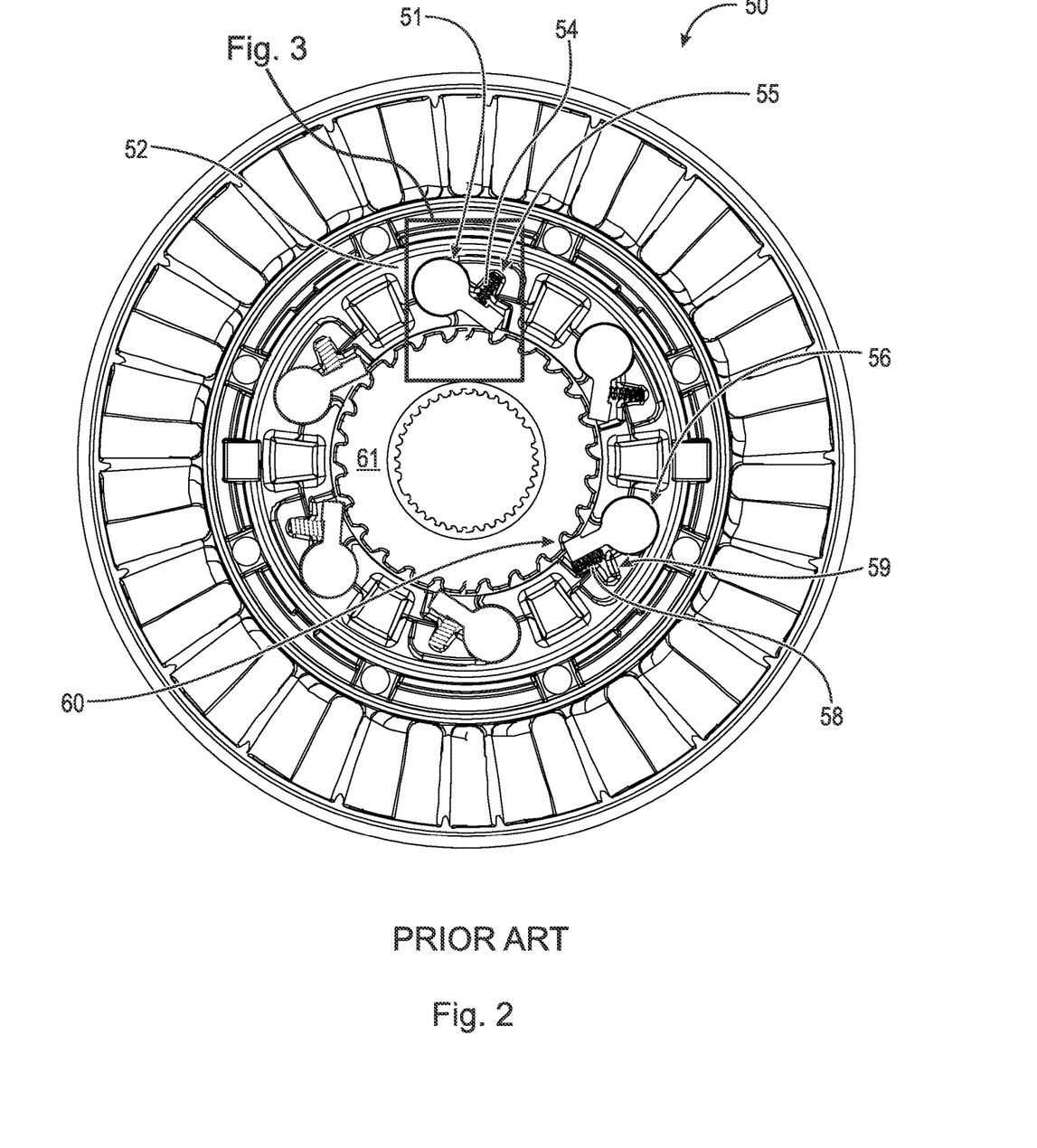
FIG. 2 is a top view of a rocker one-way clutch with a typical strut in a stator for a torque converter.
Figure 3:
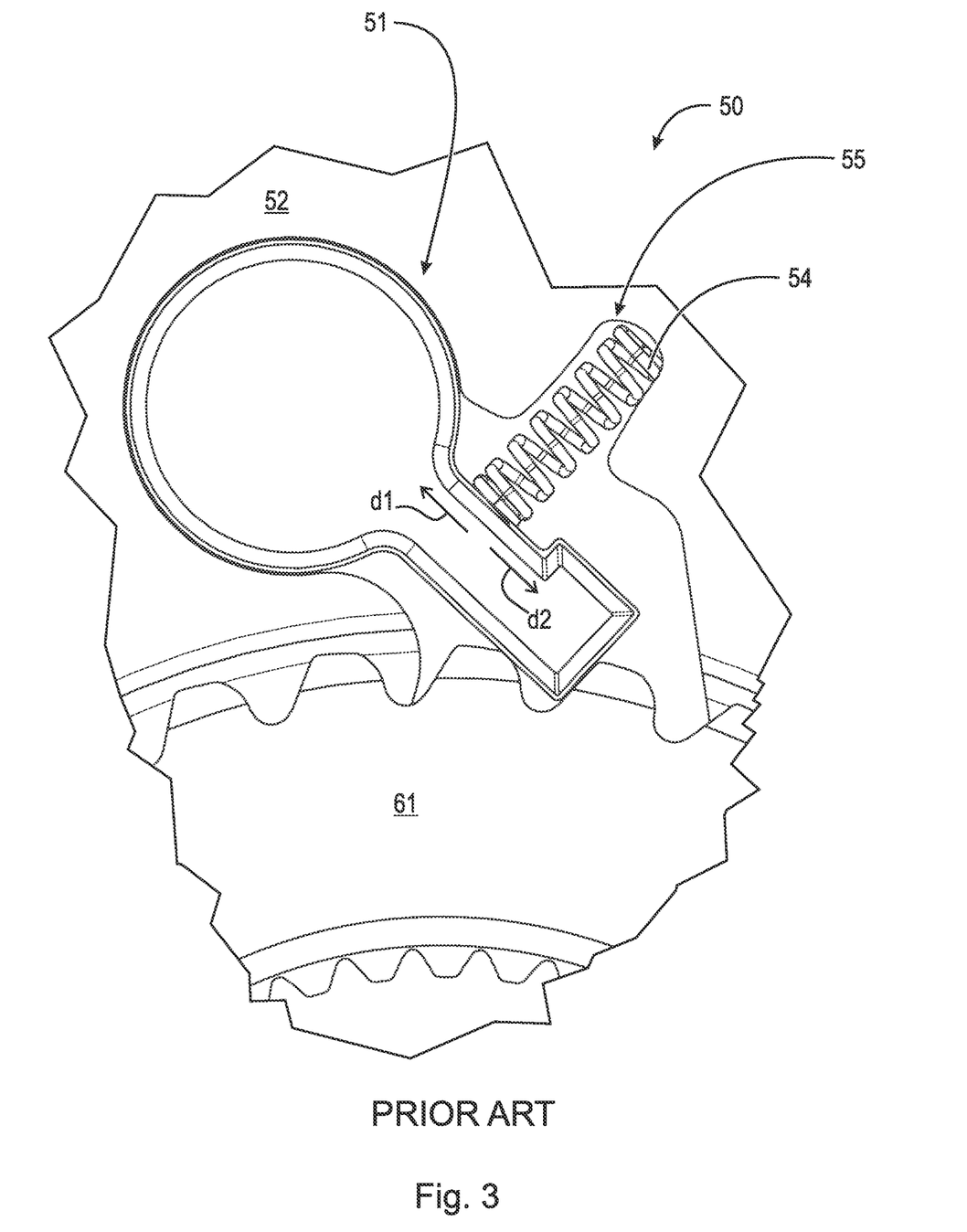
FIG. 3 is a fragmentary view of the rocker one-way clutch shown in FIG. 2 illustrating a detailed view of the strut shown encircled in FIG. 2.

A common problem with rocker one-way clutches is that the spring arranged between the housing and the strut can move out of place because the position of the spring is not maintained. Typical rocker one-way clutch 50 is shown in FIG. 2. Strut 51 is rotatably mounted within a pocket of housing 52 and spring 54 is wedged in groove 55. Spring 54 is simultaneously contacting strut 51. Spring 54 can slip along the surface of strut 51 along directions d1 and d2 shown in FIG. 3. If spring 54 of such a rocker one-way clutch slips and/or becomes jammed, then the torque converter fails to perform the multiplication function properly. Additionally, if spring 54 breaks, total replacement is necessary.

Another problem with rocker one-way clutches having an asymmetrical strut is that the strut can be unintentionally incorrectly assembled, Typical rocker one-way clutch 50 shown in FIG. 2 includes improperly installed strut 56 which has caused spring 58 to become dislodged from groove 59 of housing 52. In this improper arrangement, the contact angle between strut 56 and ramp 60 of inner race 61 is incorrect. Additionally, due to this improper arrangement, spring 58 can slip and/or become dislodged or jammed between strut 56 and housing 52. During operation of the rocker one-way clutch in the free-wheel mode, strut 56 can crush spring 58 as strut 56 is urged clockwise. A damaged spring can cause failure of one-way clutch 50 because a crushed spring can cause the inner and outer races to be non-rotatably locked.

Figure 4A:
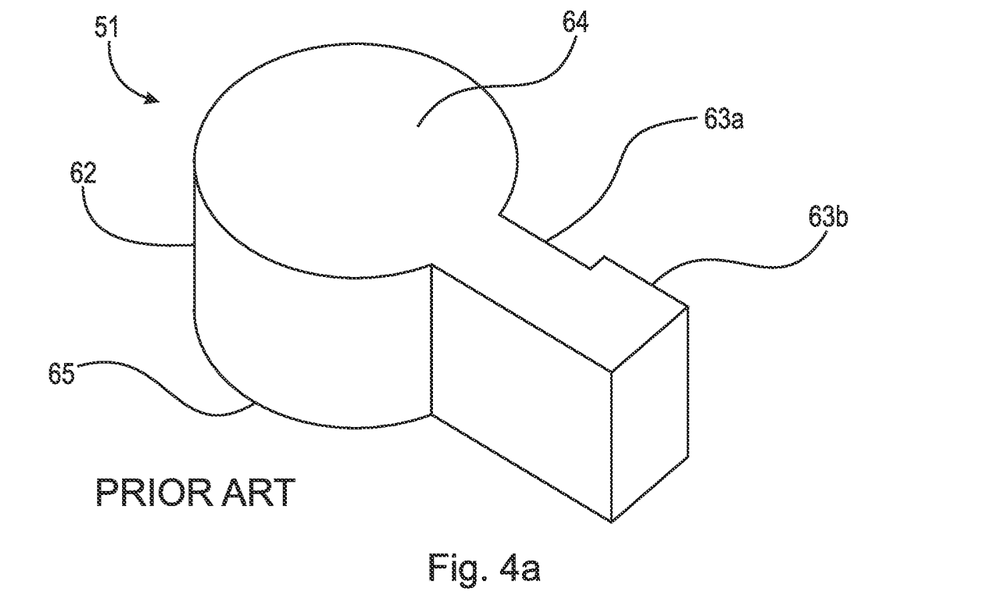
FIG. 4a is a perspective view of a typical strut of a rocker one-way clutch.
Figure 4B:
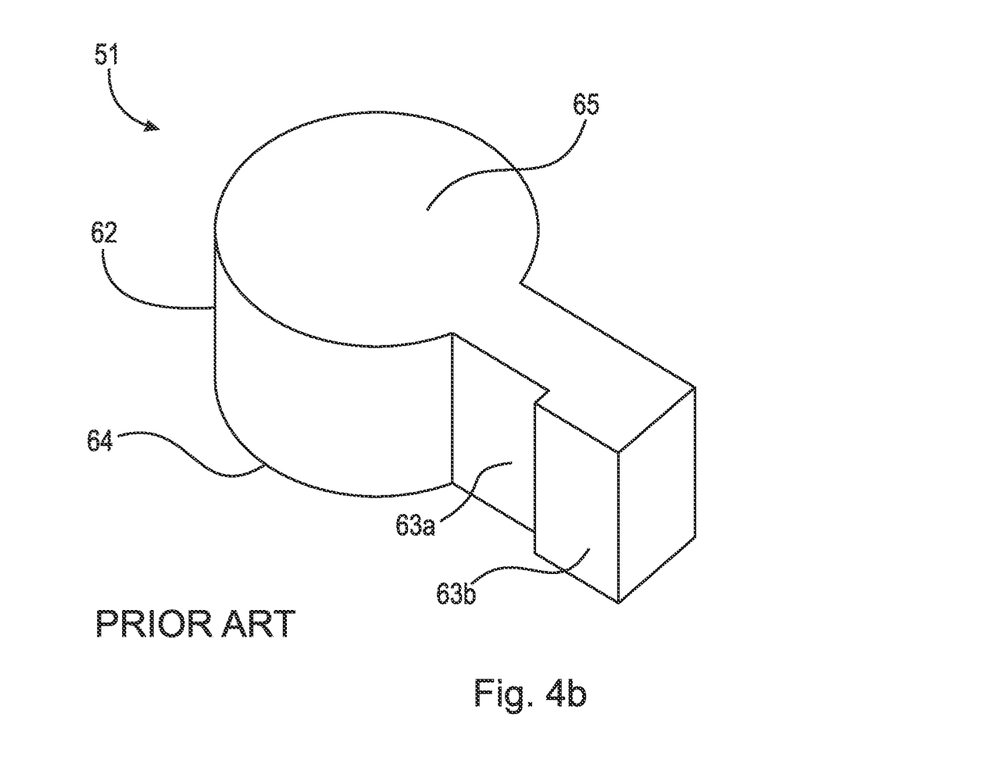
FIG. 4b is a perspective view of the typical strut shown in FIG. 4a except with the top surface facing downward.

FIG. 4a shows a perspective view of strut 51 which broadly includes main body 62, first neck portion 63a and second neck portion 63b. Main body 62 is arranged to engage with and be restrained by a pocket of housing 52 shown in FIGS. 2 and 3. First and second neck portions 63a and 63b are arranged to lock the inner and outer races of the one-way clutch. Strut 51 has top surface 64. When strut is properly installed in a one-way clutch, top surface 64 is facing upward and second neck portion 63b is facing radially outward. FIG. 4b shows a perspective view of strut 51 with bottom surface 65 facing upward. When bottom surface 65 is facing upward, strut 51 can be improperly assembled in a stator assembly. First neck portion 63a is substantially planar on all surfaces even on the surface arranged to contact a spring.

Thus, there has been a long-felt need for a strut having a cutout to maintain the position of a spring and a mechanism for ensuring the strut is properly assembled within the stator.

SUMMARY

According to aspects illustrated herein, there is provided a rocker one-way clutch including an outer race including a pocket and a strut including a main body rotatable within the pocket and a locking member, the locking member including a first neck portion extending from the main body and a cutout operatively arranged within the first neck portion to prevent displacement of a spring member.

According to aspects illustrated herein, there is provided a rocker one-way clutch including an inner race, an outer race arranged radially outward of the inner race concentrically, the outer race including a pocket, a strut including a main body rotatable within the pocket and a locking member, the locking member including a first neck portion extending from the main body, a cutout operatively arranged within the first neck portion to prevent displacement of a spring member and a protrusion operatively arranged within the first neck portion opposite of the cutout to ensure proper assembly of the strut within said inner and outer races.

According to aspects illustrated herein, there is provided a stator for a torque converter including a plurality of blades and a one-way clutch including an outer race located radially inward of the plurality of blades and including a pocket and a strut including a main body arranged in the pocket and a locking member including a first neck portion directly connected to the main body and extending from the main body in a first direction, the first neck portion having a first surface and a cutout arranged in the first surface extending in a second direction to prevent displacement of a spring member.

A primary object of the invention is to provide a strut having a cutout to maintain the position of a spring.

Another object of the invention is to provide a mechanism for ensuring the strut is properly assembled within the stator.

These and other objects, features and advantages of the present invention will become readily apparent upon a review of the following detailed description of the invention, in view of the drawings and appended claims.

BRIEF DESCRIPTION OF THE DRAWINGS

The nature and mode of operation of the present invention will now be more fully described in the following detailed description of the invention taken with the accompanying figures, in which.

DETAILED DESCRIPTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention.

Figure 1:
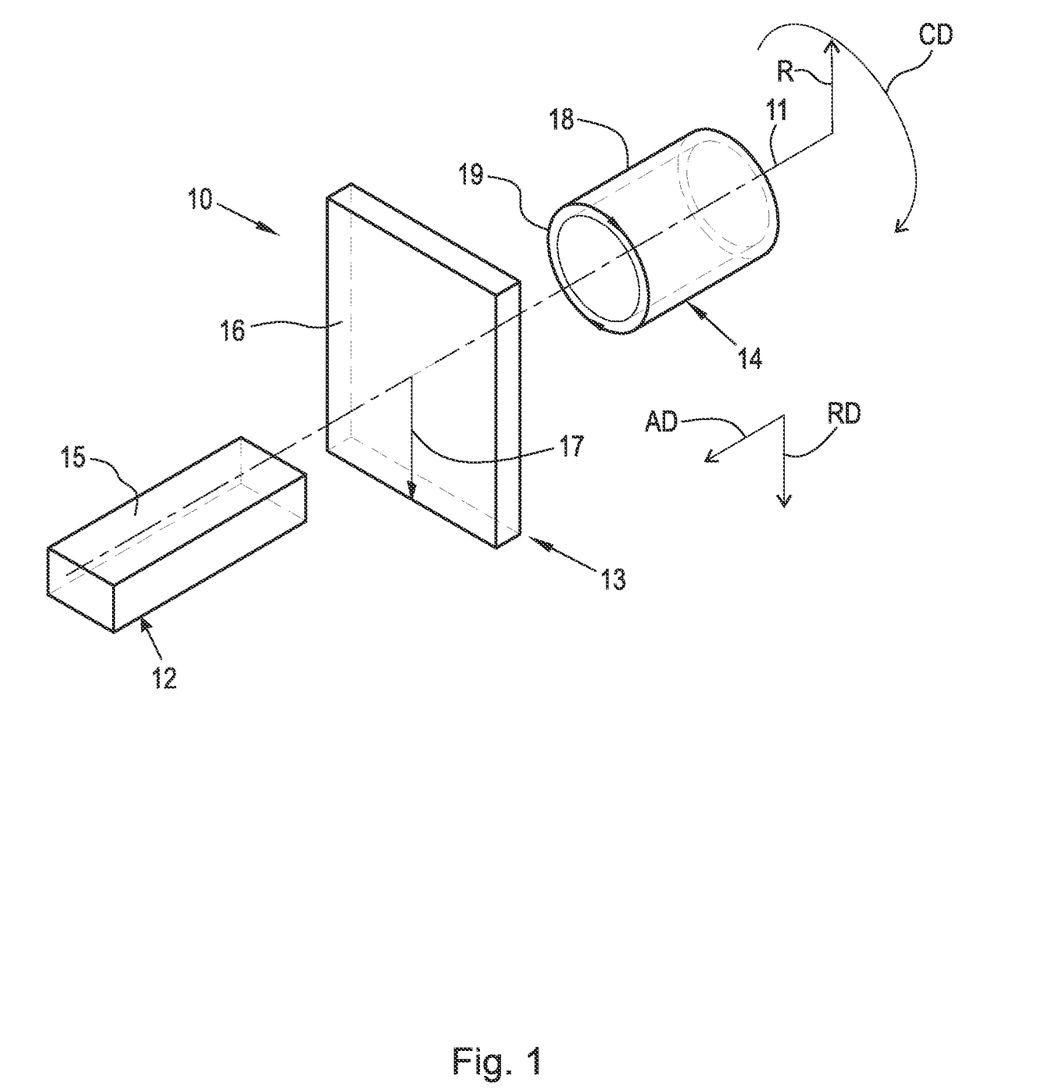
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 5A:
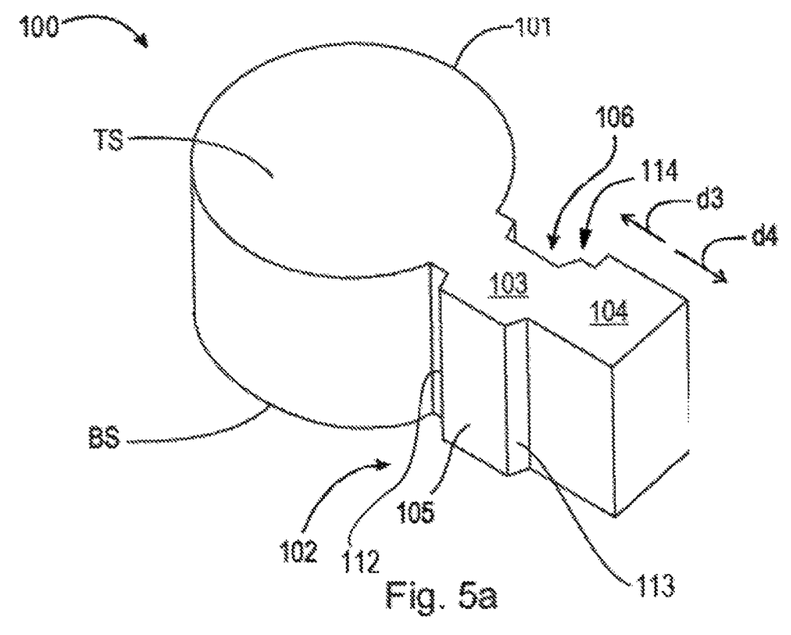
FIG. 5a is a perspective view of a strut of the invention.

FIG. 5a shows strut 100 of the invention with top surface TS facing upward.

Figure 5B:
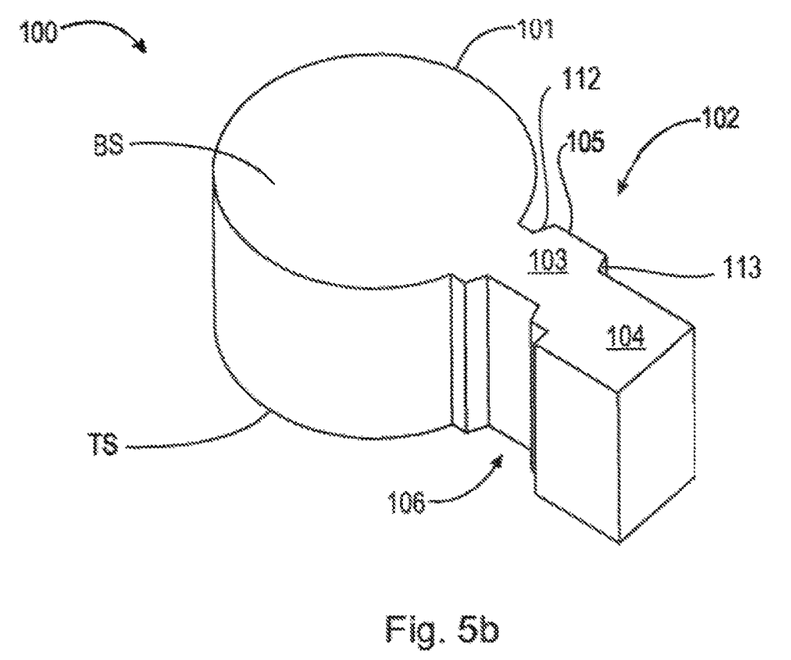
FIG. 5b is a perspective view of the strut of the invention shown in FIG. 5a except with the top surface facing downward.

FIG. 5b shows strut 100 with bottom surface BS facing upward. Cutout 106 is arranged to prevent spring S (shown in FIG. 6) from inadvertently slipping in either direction d3 or direction d4.

Figure 6:
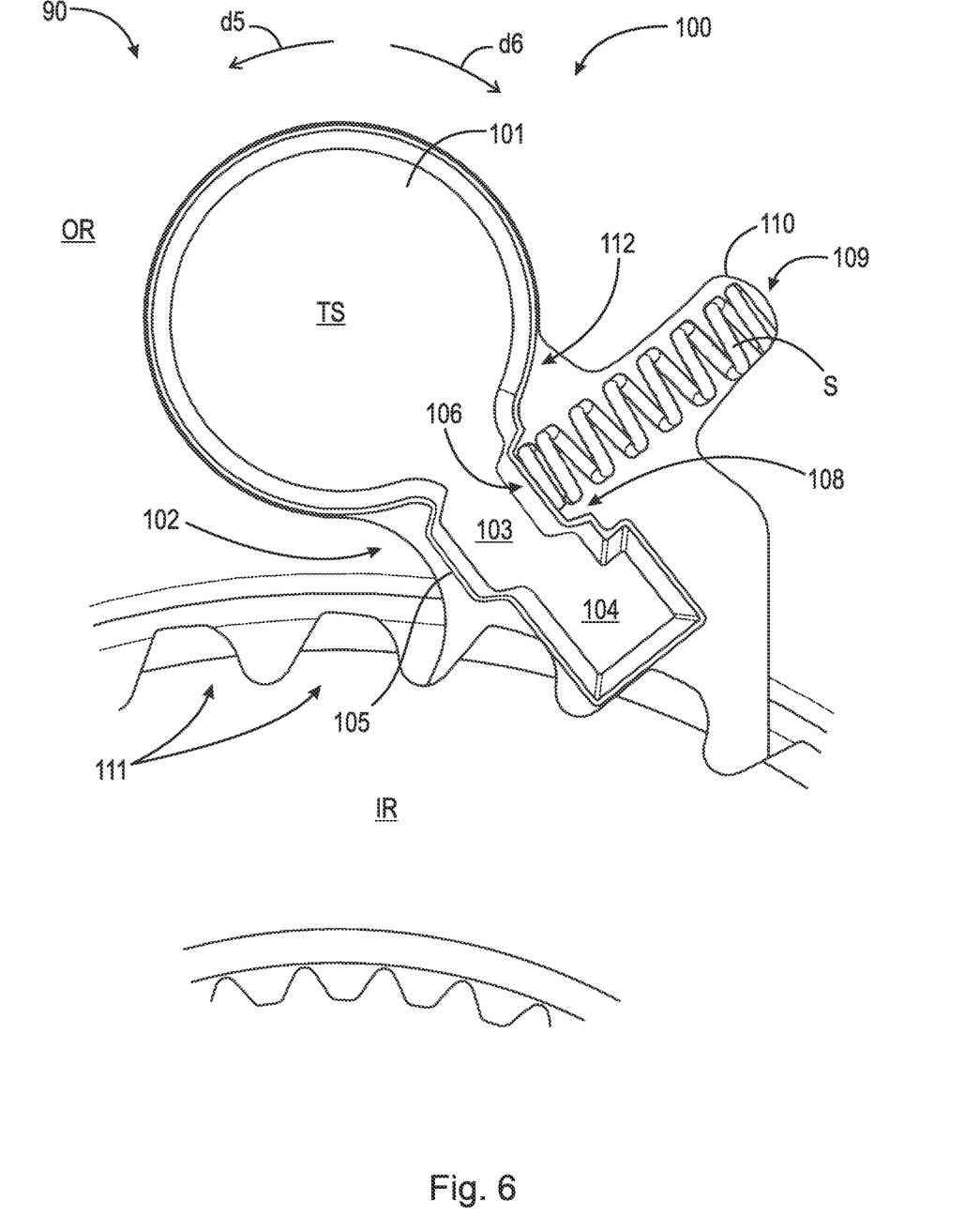
FIG. 6 is a fragmentary top view of a rocker one-way clutch incorporating the strut of the invention shown in FIG. 5; and, FIG. 7 is a fragmentary view of the rocker one-way clutch incorporating the strut of the invention shown in FIG. 6 except with the spring removed.

FIG. 6 is a fragmentary top view of stator assembly 90 incorporating strut 100 of the invention shown in FIGS. 5a and 5b. Top surface TS of strut 100 is facing upward in FIG. 6 and thus, strut 100 is properly assembled.

The following should be appreciated in view of FIGS. 5a, 5b, and 6. Strut 100 of the invention is arranged within outer race OR and inner race IR of stator assembly 90. In an embodiment, stator assembly 90 includes six struts 100 arranged symmetrically circumferentially. The side plate of stator assembly 90 is not shown in FIG. 6 so that strut 100 is visible. In an embodiment, plurality of blades (shown in FIG. 2) are arranged radially outward of outer race OR. Additionally, a stator shaft (not shown) is arranged radially inward of inner race IR. Inner race IR is non-rotatably connected to the stator shaft. Outer race OR is rotatable with respect to inner race IR in direction d5 and non-rotatable in direction d6 due to the interaction between locking member 102 of strut 100 and plurality of ramps 111 of inner race IR. In an embodiment, direction d5 is clock-wise and direction d6 is counter-clockwise. During operation and under acceleration when torque is multiplied, fluid is directed clockwise and strut 100 prevents outer race OR from rotating with respect to inner race IR.

Strut 100 broadly comprises main body 101 and locking member 102. Main body 101 sits loose in pocket 112 so that main body 101 is rotatable. Locking member 102 includes first neck portion 103 and second neck portion 104. First neck portion 103 extends from main body 101 in direction d4. In other words, first neck portion 103 extends outwardly radially from main body 101. First neck portion 103 also connects main body 101 to second neck portion 104. First neck portion 103 includes protrusion 105 and cutout 106 and both protrusion 105 and cutout 106 extend between top surface TS to bottom surface BS of first neck portion 103. In an embodiment, protrusion 105 is opposite cutout 106. Protrusion 105 may have first planar surface fthe surface that reference number 105 is pointing to) parallel to the front surface that defines the cutout. The protrusion 105 may also have a second planar surface 112 arranged nonparallel to the front surface, and a third surface 113 first surface arranged nonparallel to the front surface. Also, the cutout 106 has a surface that contacts the spring, and a ledge 114 that connects that surface to the front surface.

As shown in FIG. 6, cutout 106 is arranged to receive spring S and prevent spring S from accidentally slipping toward main body 101 or toward second neck portion 104. More specifically, cutout 106 is operatively arranged to receive first end 108 of spring S. Second end 109 of spring S is wedged in groove 110. Thus, it should be appreciated that cutout 106 is correspondingly shaped and sized to maintain the position of spring S based on the size of spring S.

Spring S may be a compression spring; however, any suitable alternative is contemplated. For example, spring S could be any rubber element or a pneumatic cylinder. In an example embodiment, strut 100 is made of powder metal having a microhardness of approximately 55-62 MC and an apparent hardness of approximately 30 HRC min. In another example embodiment, strut 100 could be made of FLC2-4808-110HT or FLC 4608-95HT, which are designations for different variations of ferrous powder metals that are heat treated. Strut 100 can also be made of steel, for example, SAE J403, which is a hard carbon steel classified by the Society of Automotive Engineers, with a hardness of approximately 55-62 HRC. Any suitable alternative is contemplated. The abbreviation "HRC" is a designation of hardness using the Rockwell C Scale, measured by pressing a specially shaped diamond cone against a clean prepared surface of the specimen with a specific force. The machine making the indention also measures the depth of the indention and provides a numerical value for that depth. It should be appreciated that any material that is very hard and resistant to permanent shape change when a compressive force is applied is contemplated. In an example embodiment, strut 100 must be made from a hard material to resist deformation due to the constant variation of compressible forces.

Figure 7:
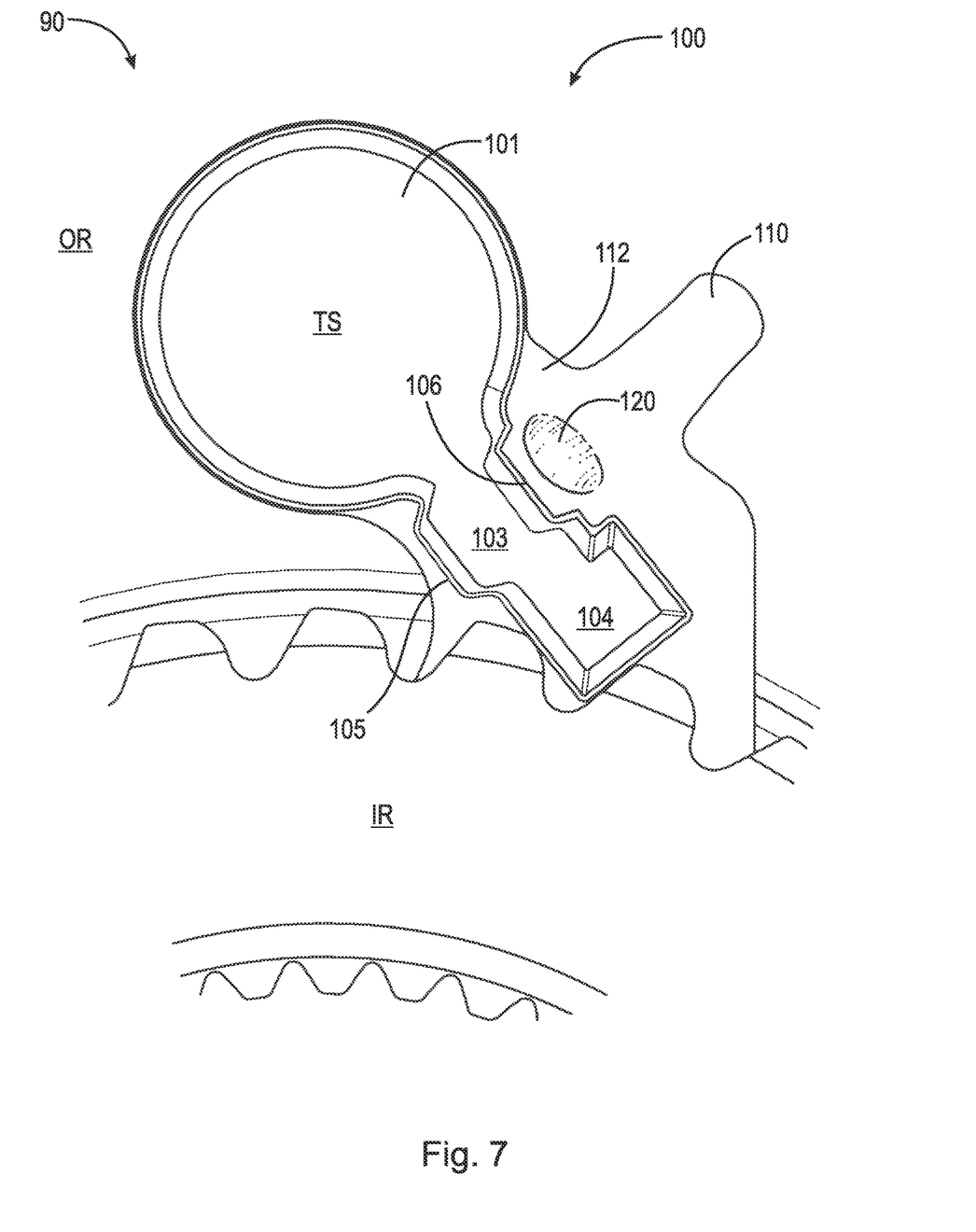

FIG. 7 shows strut 100 within stator assembly 90 without spring S. Projection 120 is positioned on the inside of outer race OR such that projection 120 protrudes into pocket 112. If strut 100 is placed within pocket 112 upside down such that cutout 106 is facing away from groove 110 (instead protrusion 105 is facing groove 110), in that case, projection 120 contacts protrusion 105. Due to the contact between protrusion 105 and projection 120, strut 100 does not sit fully within pocket 112. Instead, strut 100 is prevented from sitting within pocket 112 because protrusion 105 is sitting atop projection 120. When strut 100 is not fully within pocket 112, the side plate of stator assembly 90 cannot be assembled because strut 100 is not flush with its surrounding pocket 112. It should be appreciated that projection 120 can take any suitable shape. Additionally, projection 120 could be one of a number of projections arranged to contact protrusion 105.

In one embodiment, projection 120 is cast with outer ring OR. However, projection 120 could be a separate component and coupled with outer ring OR. It should also be appreciated that projection 120 does not interfere with spring S when and strut 100 is properly assembled. In that case, projection 120 is behind or underneath spring S.

In one embodiment, strut 100 is forged of the materials described above however, any suitable alternative material or process of forming strut 100 can be used. Additionally, strut 100 can be used with any one-way clutch application.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMBERS 50 typical one-way rocker clutch
51 strut
52 housing
54 spring
55 groove
56 improperly installed strut
59 dislodged spring
59 groove
60 ramp
61 inner race
62 main body
63a first neck portion
63b second neck portion
d1 direction
d2 direction
18 pocket
90 stator assembly
100 strut
101 main body
102 locking member
103 first neck portion
104 second neck portion
105 protrusion
106 cutout
108 first end
109 second end
110 groove
111 plurality of ramps
d3 direction
d4 direction
d5 direction
d6 direction
S spring
120 projection

What is claimed is:

1. A rocker one-way clutch, comprising:
a strut including a single top planar surface and a single bottom planar surface, the top surface being continuously parallel to the bottom surface, the strut having
a main body arranged to rotate within a pocket in an outer race about an axis of rotation, and
a locking member having a neck portion extending from the main body, the neck portion including a front surface and a rear surface arranged parallel to the front surface, the front surface defining a cutout configured to prevent displacement of a spring member, the cutout extending from the top planar surface of the strut toward the bottom planar surface of the strut and including
a first planar surface arranged parallel to the front surface;
a second planar surface arranged nonparallel to the front surface,
a third planar surface arranged nonparallel to the front surface, and
a protrusion extending from the rear surface and aligned with the cutout along a width of the neck portion.

2. The rocker one-way clutch of claim 1, wherein the outer race includes a groove and the spring member includes a first end and a second end and wherein the first end of the spring member is arranged in the groove and the second end of the spring member is arranged within the cutout and the spring member is arranged to push the locking member radially inward from the outer race.

3. The rocker one-way clutch of claim 1, further comprising an inner race arranged radially inward of the outer race, wherein:
the outer race is rotatable with respect to the inner race in a first direction; and in a second direction, the spring member is operatively arranged to cause a first end of the locking member to contact the inner race such that the outer race is non-rotatable with respect to the inner race.

4. The rocker one-way clutch of claim 1, wherein the outer race includes a groove to hold the spring member and the cutout is substantially aligned with the groove.

5. The rocker one-way clutch of claim 1, wherein the cutout is operatively arranged to face radially outwards toward the outer race.

6. The rocker one-way clutch of claim 1, wherein the outer race includes six pockets for six struts.

7. A rocker one-way clutch, comprising:
an outer race including a pocket;
an inner race having a plurality of ramps; and
a strut having
a main body configured to rotate within the pocket, and
a locking member having a neck extending from the main body, the neck extending along a length and having a width, the neck having a spring-engaging side and an opposing ramp-engaging side configured to engage one of the ramps,
wherein the spring-engaging side defines a cut-out configured to engage a spring and sized to inhibit displacement of the spring along the length of the neck, and wherein the ramp-engaging side defines a protrusion aligned with the cut-out relative to the width of the neck.

8. The rocker one-way clutch of claim 7, wherein the outer race includes a groove holding the spring, and the spring extends from the groove to the cut-out.

9. The rocker one-way clutch of claim 8, wherein the groove, the spring, the cut-out, and the protrusion are all aligned in a direction of the width.

10. The rocker one-way clutch of claim 8, wherein the spring-engaging side includes a first surface contacting the spring, a second surface parallel to the first surface, and a ledge connecting the first and second surfaces.

11. The rocker one-way clutch of claim 7, wherein the protrusion faces the ramps.

12. The rocker one-way clutch of claim 7, wherein the cut-out faces away from the ramps.

13. The rocker one-way clutch of claim 7, wherein the cut-out extends entirely from a top planar surface of the strut to a bottom planar surface of the strut.

14. The rocker one-way clutch of claim 7, wherein the protrusion extends entirely from a top planar surface of the strut to a bottom planar surface of the strut.

15. A rocker one-way clutch comprising:
an inner race;
an outer race arranged radially outward of the inner race, the outer race defining a pocket; and
a strut including a top surface and an opposing bottom surface, the strut further including
a main body rotatable within the pocket about an axis of rotation, and
a locking member having a neck extending from the main body, the neck being asymmetrical and including a front surface arranged orthogonal to the top surface and an opposing rear surface, the front surface defining a cut-out configured to inhibit displacement of a spring contacting the front surface, the cut-out having
a first surface arranged parallel to the front surface,
a second surface arranged nonparallel to the front surface, and
a third surface arranged nonparallel to the front surface,
wherein the locking member includes a protrusion arranged on the rear surface and extending toward the inner race.

16. The rocker one-way clutch of claim 15, wherein the locking member includes a protrusion arranged on the front surface and extending toward the outer race.

17. The rocker one-way clutch of claim 15, wherein the protrusion is configured to contact a component of the outer race when the strut is assembled incorrectly.

* * * * *